United States Patent
Chen et al.

(10) Patent No.: US 11,372,198 B2
(45) Date of Patent: Jun. 28, 2022

(54) DEVICE FOR ADJUSTING INTERPUPILLARY DISTANCE AND HEAD-MOUNTED DISPLAY APPARATUS

(71) Applicant: Quanta Computer Inc., Taoyuan (TW)

(72) Inventors: Chun-Lung Chen, Taoyuan (TW);
Han-Chih Hu, Taoyuan (TW);
Shan-Peng Lai, Taoyuan (TW);
Yu-Han Liu, Taoyuan (TW);
Chun-Hung Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 288 days.

(21) Appl. No.: 16/835,830

(22) Filed: Mar. 31, 2020

(65) Prior Publication Data

US 2021/0208364 A1    Jul. 8, 2021

(30) Foreign Application Priority Data

Jan. 2, 2020  (TW) .................................. 109100004

(51) Int. Cl.
*G02B 7/12*    (2021.01)
*G02B 27/01*   (2006.01)

(52) U.S. Cl.
CPC ........... *G02B 7/12* (2013.01); *G02B 27/0176* (2013.01); *G02B 2027/0159* (2013.01)

(58) Field of Classification Search
CPC .................. G02B 7/12; G02B 27/0176; G02B 2027/0159
See application file for complete search history.

(56) References Cited

U.S. PATENT DOCUMENTS

| | | | | |
|---|---|---|---|---|
| 5,734,499 A | * | 3/1998 | Matsumoto | G02B 7/12 359/417 |
| 2015/0316741 A1 | * | 11/2015 | Kim | G02B 7/023 359/825 |
| 2016/0030811 A1 | * | 2/2016 | Chiang | A63B 33/004 2/442 |
| 2016/0320612 A1 | * | 11/2016 | Zhang | G02B 27/017 |
| 2017/0011210 A1 | * | 1/2017 | Cheong | A61B 5/681 |
| 2018/0338130 A1 | * | 11/2018 | Miller | G02B 27/0176 |

FOREIGN PATENT DOCUMENTS

| | | | | |
|---|---|---|---|---|
| CN | 104914579 B | * | 11/2017 | ............. G02B 27/01 |
| CN | 104914579 B | | 11/2017 | |
| CN | 108663814 A | * | 10/2018 | ......... G02B 27/0172 |
| CN | 209433128 U | * | 9/2019 | ............... G02B 7/12 |
| CN | 209433128 U | | 9/2019 | |

OTHER PUBLICATIONS

Chinese language office action dated Sep. 3, 2020, issued in application No. TW 109100004.

* cited by examiner

*Primary Examiner* — Kwang-Su Yang
(74) *Attorney, Agent, or Firm* — McClure, Qualey & Rodack, LLP (57) ABSTRACT

A device for adjusting interpupillary distance is provided. The device for adjusting interpupillary distance includes an adjustment bottom, a housing, and an adjustment support. The housing is disposed on the adjustment bottom. The housing includes a base, a holder, and a deformation part disposed between the base and the holder. The holder moves relative to the base via the deformation part. The adjustment support is connected to the holder and the adjustment bottom.

18 Claims, 6 Drawing Sheets

DEVICE FOR ADJUSTING INTERPUPILLARY DISTANCE AND HEAD-MOUNTED DISPLAY APPARATUS

CROSS-REFERENCE TO RELATED APPLICATIONS

This application claims the benefit of Taiwan Patent Application No. 109100004, filed on 2020 Jan. 2, the entirety of which is incorporated by reference herein.

BACKGROUND OF THE INVENTION

Field of the Invention

The present invention relates to a head-mounted display apparatus that is capable of adjusting the interpupillary distance (IPD).

Description of the Related Art

When a user wears a head-mounted display apparatus, the user usually has to adjust the interpupillary distance of the head-mounted display apparatus to match his or her own interpupillary distance. The interpupillary distance is the distance between the centers of the pupils of the left-eye and the right-eye and may vary from person to person. Normally, the methods of adjusting interpupillary distance are physical and it can also be done using software. Physical adjustments may change the distance between lenses. Software-driven adjustments determine the display range after measuring the interpupillary distance of the user. If the interpupillary distance of the head-mounted display apparatus is not adjusted properly, the visual effects may be not good, even to the extent that the user feels uncomfortable or dizzy.

Generally, there are two types of display modules that can be used in a head-mounted display apparatus: a one-piece display module or a two-piece display module. A one-piece display module may have two different regions—one corresponding to the left-eye and one corresponding to the right-eye—on a single display module to show images corresponding to the left-eye and the right-eye, respectively. Alternatively, the left-eye display module and the right-eye display module may also be integrated into a one-piece display module. In one-piece display module, there is a fixed distance between the left-eye display module and the right-eye display module. In a two-piece display module, the left-eye display module and the right-eye display module are physically separated and may move relative to each other. This means that the interpupillary distance in a two-piece display module may be adjusted by physically moving the left-eye display module and/or the right-eye display module. However, it is difficult to adjust the interpupillary distance in a one-piece display module except through the use of software.

Therefore, finding a way to adjust the interpupillary distance of a head-mounted display apparatus with a single-piece display module is important.

BRIEF SUMMARY OF THE INVENTION

Some embodiments of this disclosure provide a device for adjusting interpupillary distance. The device for adjusting interpupillary distance includes an adjustment bottom, a housing, and an adjustment support. The housing is disposed on the adjustment bottom. The housing includes a base, a holder, and a deformation part disposed between the base and the holder. The holder moves relative to the base via the deformation part. The adjustment support is connected to the holder and the adjustment bottom.

Some embodiments of this disclosure provide a head-mounted display apparatus. The head-mounted display apparatus includes the aforementioned device for adjusting interpupillary distance, an optical element, and a display module. The optical element is disposed in the holder. The display module is disposed between the base and the adjustment bottom.

BRIEF DESCRIPTION OF THE DRAWINGS

The present invention may be more fully understood by reading the subsequent detailed description and examples with references made to the accompanying drawings.

DETAILED DESCRIPTION OF THE INVENTION

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

Figure 1:
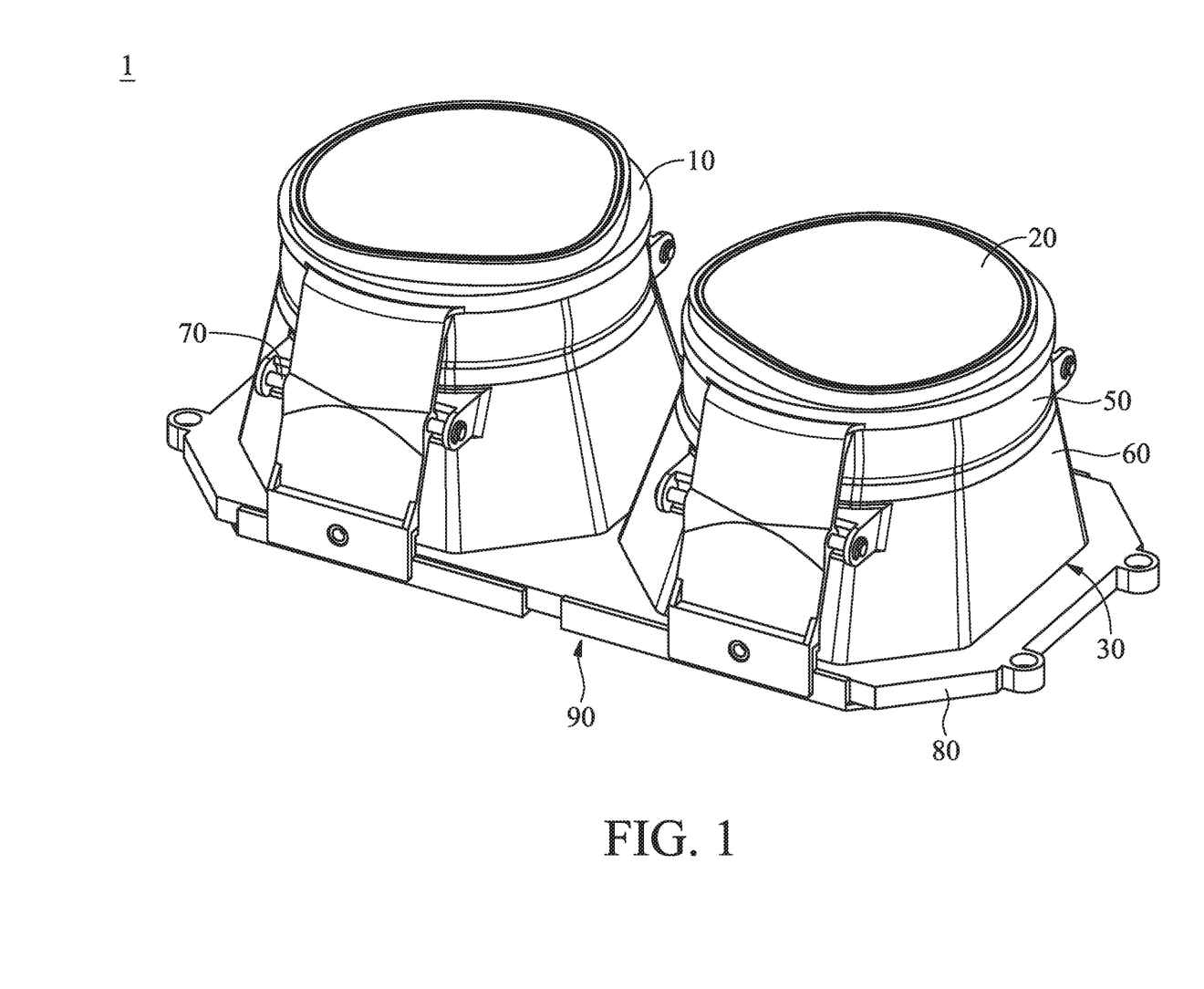
FIG. 1 is a perspective view of a head-mounted display apparatus according to some embodiments.
Figure 2:
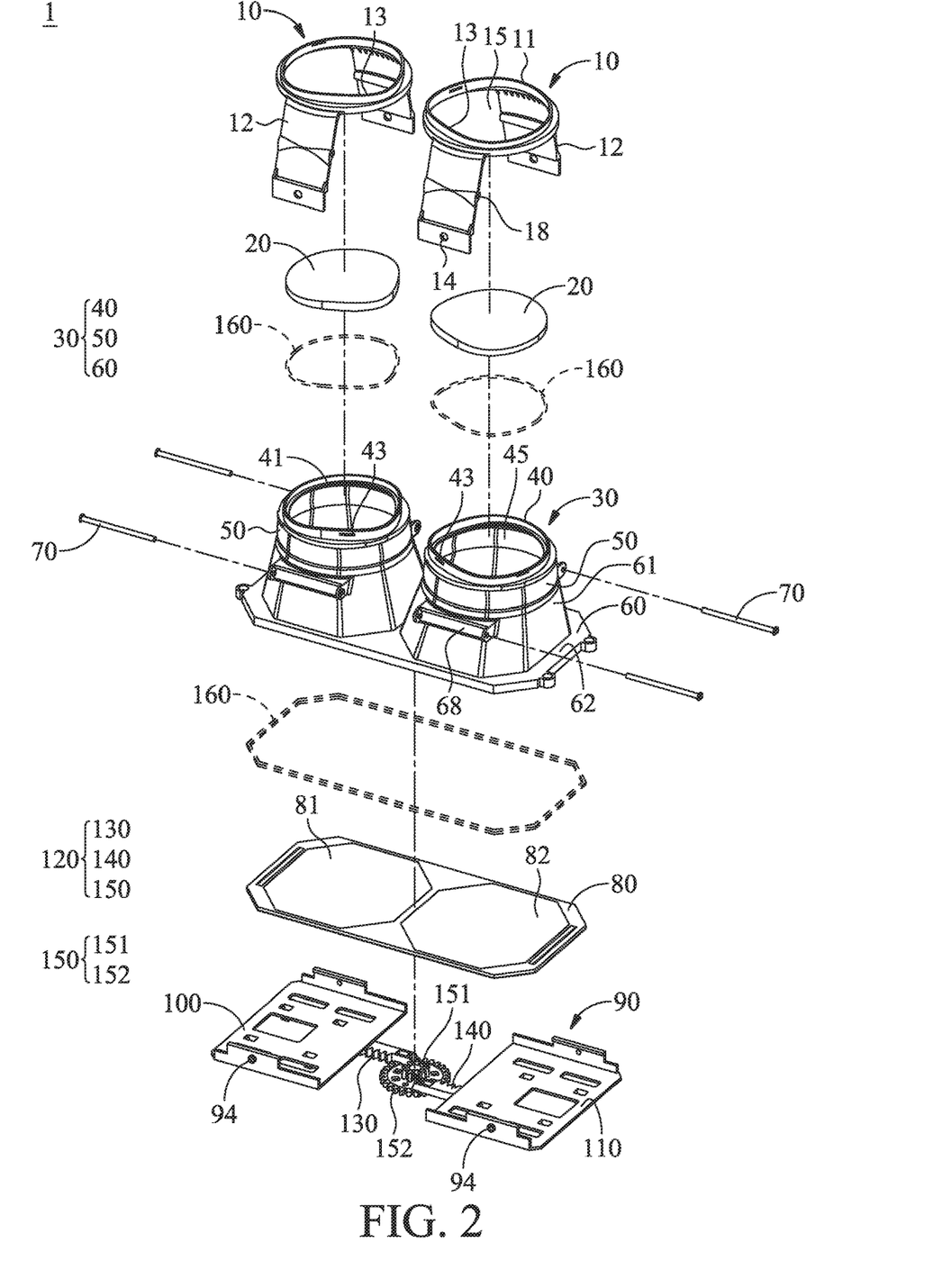
FIG. 2 is an exploded view of the head-mounted display apparatus according to some embodiments.

FIG. 1 is a perspective view of a head-mounted display apparatus 1 according to some embodiments. FIG. 2 is an exploded view of the head-mounted display apparatus 1 according to some embodiments. The user may wear the head-mounted display apparatus 1 on the head. For clarity of illustration, the outer mask, the nose pad, the face pad, the fixing belt used for wearing, and the like are omitted in FIG. 1 and FIG. 2 to show the internal elements of the head-mounted display apparatus 1. The head-mounted display apparatus 1 may be an eye mask, a helmet, and the like. In some embodiments, the head-mounted display apparatus 1 may be a virtual reality (VR) apparatus.

The head-mounted display apparatus 1 of this disclosure includes two adjustment supports 10, two optical elements 20, a housing 30, a display module 80, and an adjustment bottom 90. Among these elements, the optical elements 20 and the display module 80 are used for imaging, and the adjustment supports 10, the housing 30, and the adjustment bottom 90 are used for adjusting the interpupillary distance. The eyes of the user are located on the side of the head-mounted display apparatus 1 that is closer to the optical elements 20.

Each of the two adjustment supports 10 includes a main body 11 and two supporting parts 12. The main body 11 is circular, including an opening 15. The supporting parts 12 are arranged symmetrically to support the main body 11.

The optical elements 20 are disposed in the housing 30. The optical elements 20 may have different shapes, such as circular or oval. Each of the optical elements 20 may be a lens, such as a Fresnel lens. The optical elements 20 may be made of plastic or glass. When the optical elements 20 are made of plastic, their weight is lighter and their cost is lower. When the optical elements 20 are made of glass, their optical properties are better.

The housing 30 is disposed under the main body 11 of the adjustment supports 10 and over the adjustment bottom 90. The housing 30 is sealed to prevent dust from entering the housing 30. Dust may be enlarged due to the optical property of the optical elements 20 to interfere with the user's experience. Therefore, the housing 30 is usually made of a dust-proof material that does not generate dust.

The housing 30 includes two holders 40, two deformation parts 50, and a base 60. The holder 40 is disposed over the base 60. The deformation part 50 is disposed between the holder 40 and the base 60. The holder 40 and the base 60 are made of a material that cannot deform, such as plastic or metal. Additionally, the material of the holder 40 may be the same as or different from the material of the base 60. The deformation part 50 is made of a deformable material, for example, an elastic material, such as rubber. The holder 40 is circular, including an opening 45. The opening 45 of the holder 40 corresponds to the opening 15 of the adjustment supports 10. The base 60 includes two conical structures 61 and a substrate 62. The cross-section of the conical structures 61 gradually becomes wider toward the adjustment bottom 90 from the adjustment supports 10. The substrate 62 is located on the bottommost of the housing 30.

In some embodiments, to enhance the degree of sealing of the housing 30, the holder 40, the deformation part 50, and the base 60 are formed integrally. First, the holder 40 and the base 60 are manufactured in different molds by plastic injection molding, etc. Then, the holder 40 and the base 60 that are just manufactured are placed in another mold, and the space between the holder 40 and the base 60 is reserved. Finally, an elastic material is injected into the space, and the deformation part 50 is formed after the elastic material cools down. As a result, the deformation part 50 is tightly connected to the holder 40 and the deformation part 50 is tightly connected to the base 60 as well in order to form the inseparable housing 30, thereby achieving great sealing and dust-proof effects. In addition, the housing 30 formed integrally may simplify the assembly of the housing 30.

In some embodiments, the head-mounted display apparatus 1 further includes four sliding shafts 70. The supporting parts 12 of the adjustment supports 10 further include four receiving parts 18. The base 60 further includes four fixing parts 68. Each of the sliding shafts 70 passes through one of the receiving parts 18 of the adjustment supports 10. Each of the sliding shafts 70 is disposed in one of the fixing parts 68 of the base 60. The sliding shaft 70 may position the adjustment supports 10, the base 60, and the adjustment bottom 90, ensure the adjustment supports 10 may move or slide smoothly, and ensure the distance between the adjustment supports 10 and the adjustment bottom 90 keeps the same during the movement of the adjustment supports 10. The number and the shape of the sliding shafts 70, the receiving parts 18, and the fixing parts 68 are not limited thereto.

The display module 80 may be a liquid crystal display (LCD) module (LCM), an organic light-emitting diode (OLED) panel, etc. The display module 80 is disposed between the housing 30 and the adjustment bottom 90. The display module 80 includes a left-eye display module 81 and a right-eye display module 82, for displaying a left-eye image and a right-eye image, respectively.

It should be noted that, in this disclosure, as shown in FIG. 2, the display module 80 is a one-piece display module. The left-eye display module 81 and the right-eye display module 82 are inseparable (the relative position is fixed). That is, the left-eye display module 81 and the right-eye display module 82 may not move relative to each other. How to adjust the interpupillary distance of the head-mounted display apparatus 1 including the one-piece display module 80 is described in detail in the following content.

The adjustment bottom 90 is disposed under the display module 80. The adjustment bottom 90 includes a first bottom plate 100, a second bottom plate 110, and a connection piece 120. The connection piece 120 is movably connected to the first bottom plate 100 and the second bottom plate 110, so that the first bottom plate 100 and the second bottom plate 110 may move relative to each other. The connection piece 120 includes a first gear rack 130, a second gear rack 140, and a gear 150. In this embodiment, the gear 150 includes an inner gear 151 and an outer gear 152. The size of the inner gear 151 is smaller than the size of the outer gear 152. The inner gear 151 engages with the first gear rack 130 and the second gear rack 140. The outer gear 152 equipped with a larger size is for the convenience of rotation. The rotation of the inner gear 151 may be conducted by the rotation of the outer gear 152. In one embodiment, the outer gear 152 may be omitted.

During the assembly of the head-mounted display apparatus 1, to prevent dust or other particles from entering the housing 30, the assembly is normally conducted in a clean room. First, the optical elements 20 and the display module 80 are combined with the housing 30. The internal space of the holder 40 may be provided with a trench 41 to strengthen the connection between the holder 40 and the optical elements 20. In some embodiments, an adhesion element 160 may be provided mechanically or manually between the optical elements 20 and the holder 40 and/or between the display module 80 and the base 60 to strengthen the connection between these elements. For example, the adhesion element 160 may be provided on the entire periphery of the optical elements 20 and/or the entire periphery of the display module 80. The adhesion element 160 may be optical glue, a waterproof double-coated tape, or something similar.

When the optical elements 20 and the display module 80 are combined with the housing 30, a sealing space is formed inside the housing 30. Then, the housing 30 is disposed on the adjustment bottom 90, and the adjustment supports 10 is put to cover the housing 30 to connect to the holder 40 and the adjustment bottom 90.

In this embodiment, the main body 11 of the adjustment supports 10 includes two engagement structures 13, and the holder 40 includes two engagement parts 43 corresponding to the engagement structures 13 to strengthen the connection between the adjustment supports 10 and the holder 40. For example, the engagement structure 13 of the adjustment supports 10 may be a hook and the engagement part 43 of the holder 40 may be a recess corresponding to the hook.

Additionally, the supporting parts 12 of the adjustment supports 10 include four through holes 14 and the adjustment bottom 90 includes four protrusions 94 corresponding to the through holes 14 to strengthen the connection between the adjustment supports 10 and the adjustment bottom 90. The connection methods are for illustration and are not limited thereto.

Figure 3:
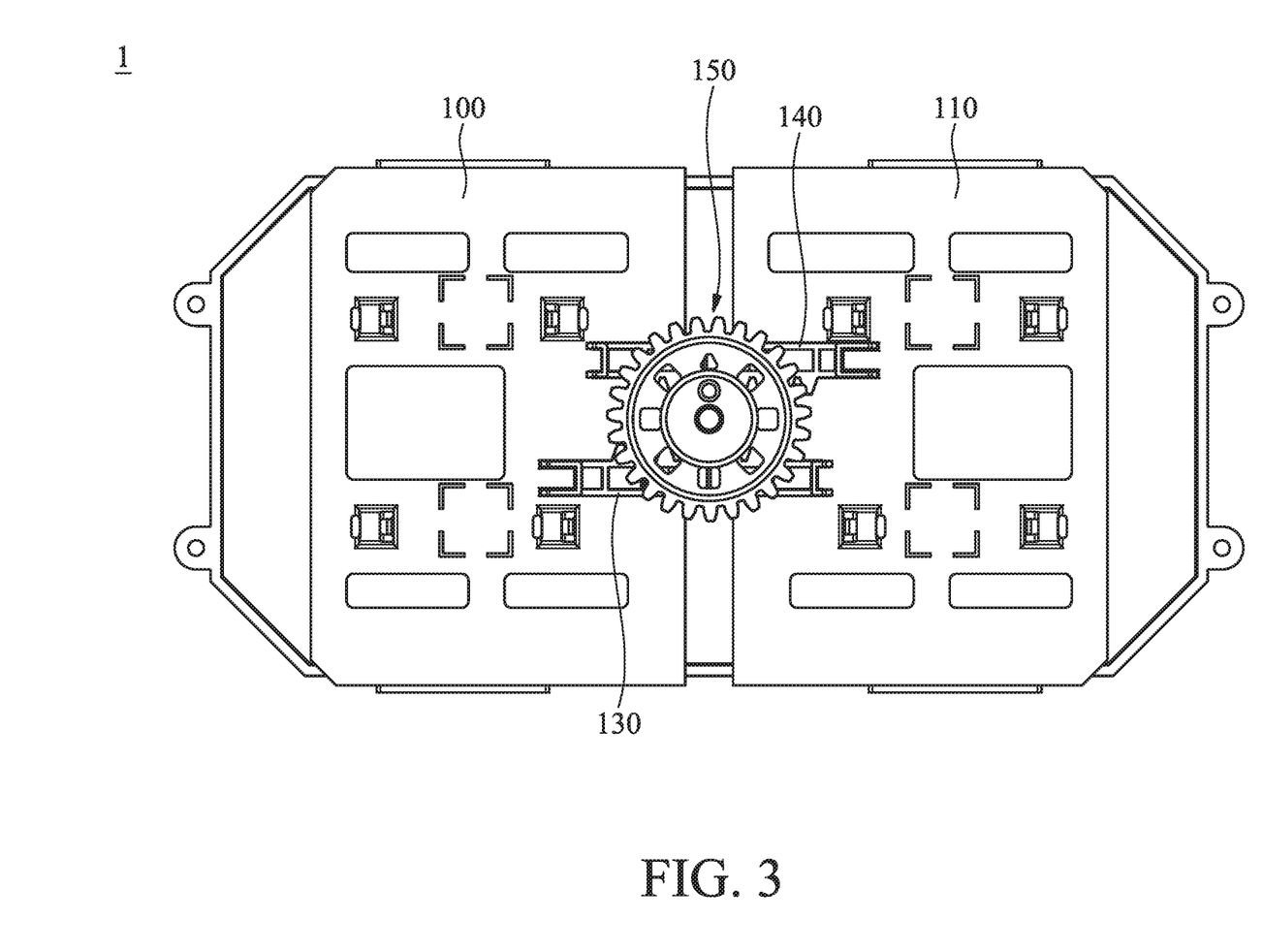
FIG. 3 is a top view of the head-mounted display apparatus according to some embodiments.

FIG. 3 is a top view of the head-mounted display apparatus 1 according to some embodiments to understand the configuration of the connection piece 120. The first gear rack 130 is disposed on the first bottom plate 100. The second gear rack 140 is disposed on the second bottom plate 110. As the gear 150 rotates clockwise or counterclockwise, the first gear rack 130 and the second gear rack 140 may be closer to each other or be farther away from each other. Therefore, the first bottom plate 100 and the second bottom plate 110 may be closer to each other or be farther away from each other as well.

The connection piece 120 may be any element that makes the first bottom plate 100 and the second bottom plate 110 move relative to each other, such as a connection bar or a gear. For example, a connection bar may be placed between the first bottom plate 100 and the second bottom plate 110, and the distance between the first bottom plate 100 and the second bottom plate 110 is changed by the movement or the rotation of the connection bar. Alternatively, the first bottom plate 100 and the second bottom plate 110 may include engaged gears. Similarly, the first bottom plate 100 and the second bottom plate 110 may be closer to each other or farther away from each other as the gears rotate clockwise or counterclockwise.

Figure 4:
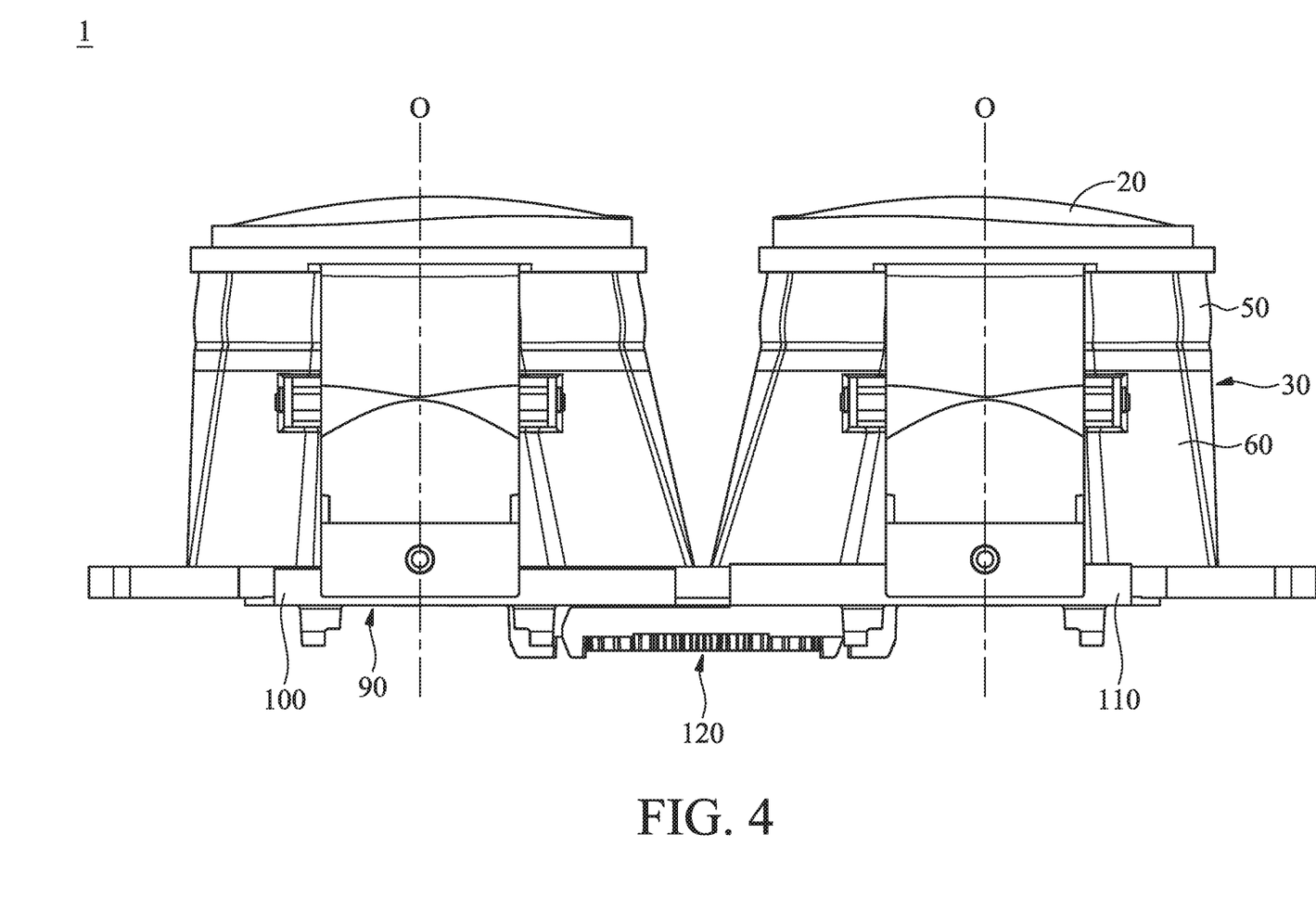
FIG. 4, FIG. 5, and FIG. 6 are side views of the head-mounted display apparatus according to some embodiments.
Figure 5:
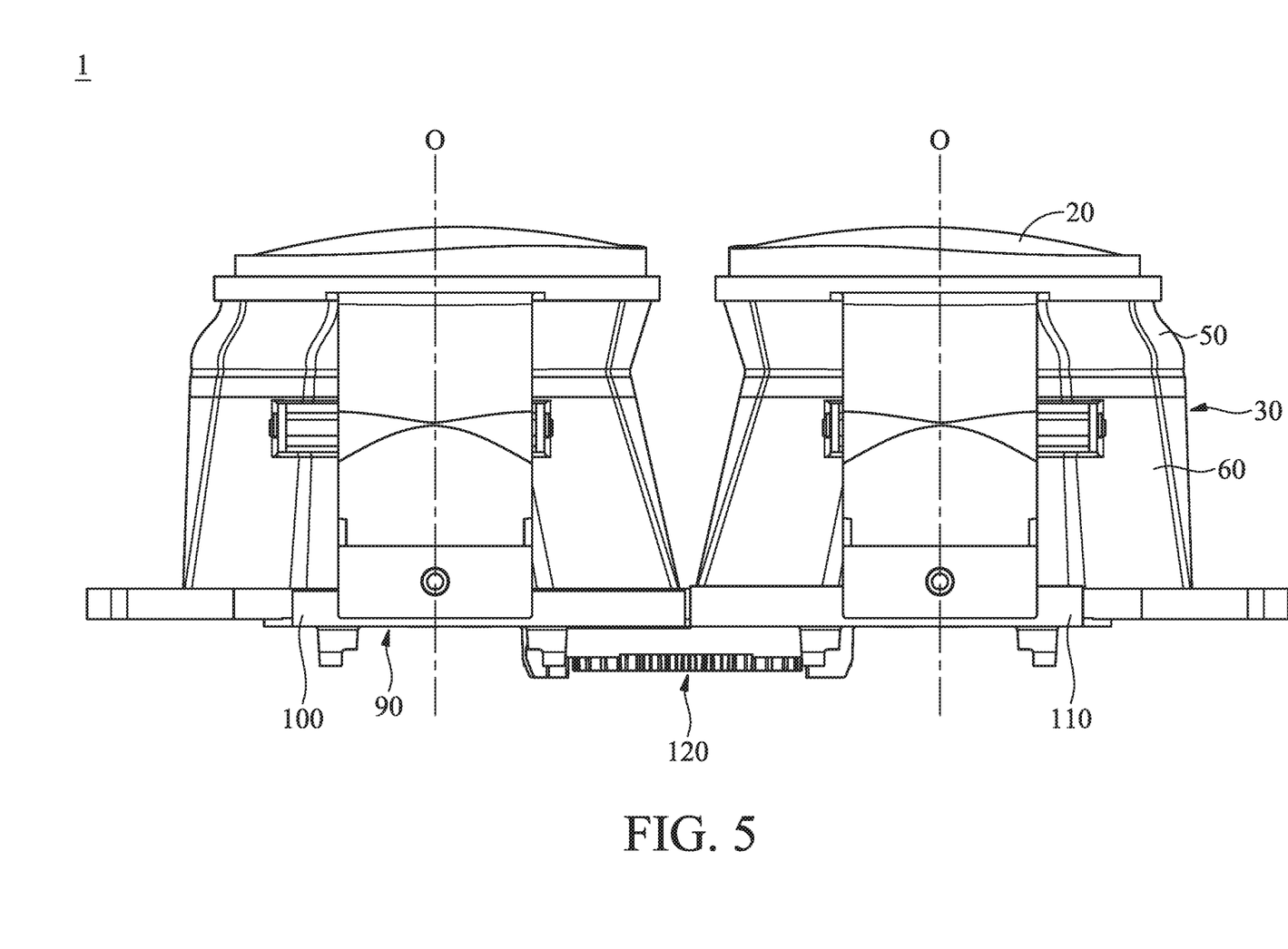
Figure 6:
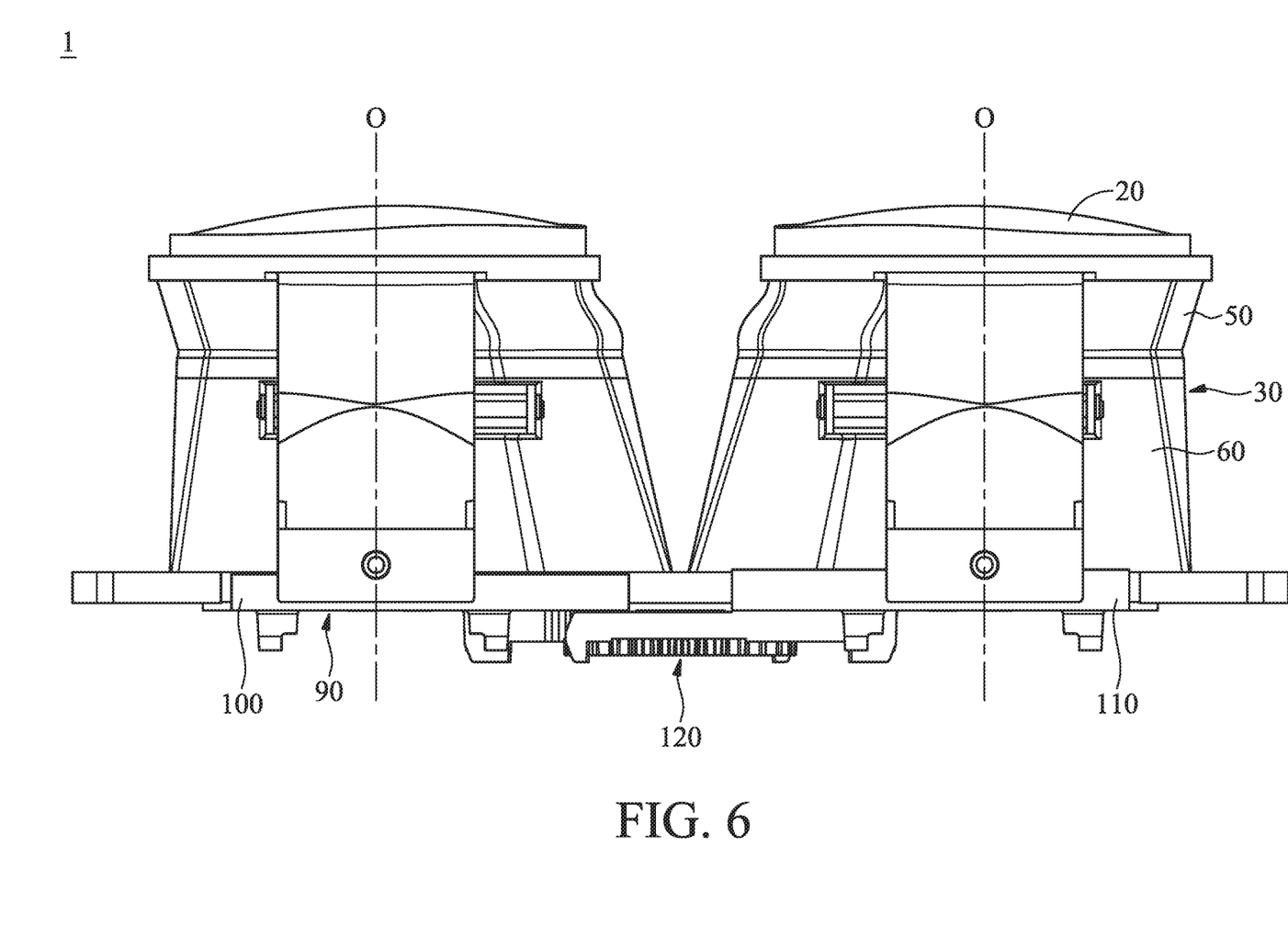

Next, please refer to FIG. 4 to FIG. 6 to understand how the interpupillary distance of the head-mounted display apparatus 1 is adjusted. FIG. 4, FIG. 5, and FIG. 6 are side views of the head-mounted display apparatus 1 according to some embodiments, in which the interpupillary distances of the head-mounted display apparatus 1 of FIG. 4 to FIG. 6 are different.

In FIG. 4 to FIG. 6, two optical axes O passing through the centers of the optical elements 20 are shown. FIG. 5 illustrates the head-mounted display apparatus 1 with the minimum interpupillary distance. FIG. 6 illustrates the head-mounted display apparatus 1 with the maximum interpupillary distance.

FIG. 4 is used as a reference for comparison in the following description. In FIG. 5, the distance between the first bottom plate 100 of the adjustment bottom 90 and the second bottom plate 110 of the adjustment bottom 90 is decreased by the connection piece 120. In FIG. 6, the distance between the first bottom plate 100 of the adjustment bottom 90 and the second bottom plate 110 of the adjustment bottom 90 is increased by the connection piece 120. It should be noted that the elements or component that are able to move include the adjustment supports 10, the optical elements 20, the holder 40 (not shown from this perspective because of the adjustment supports 10), the deformation parts 50, and the adjustment bottom 90. On the other hand, the position of the base 60 and the display module 80 (not shown from this perspective because of the base 60) is fixed.

When the first bottom plate 100 and the second bottom plate 110 move relative to each other, the movement may make the adjustment supports 10 connected to the adjustment bottom 90 to move, thereby pushing the holder 40 connected to the adjustment supports 10 to move in order to change the positions of the optical elements 20 in the holder 40. Thus, the interpupillary distance of the head-mounted apparatus 1 is adjusted.

Due to the existence of the deformation part 50, the holder 40 may move relative to the base 60, thereby changing the positions of the optical elements 20 in the holder 40 to achieve the target of adjusting the interpupillary distance. In addition, after the adjustment of the interpupillary distance of the head-mounted display apparatus 1 is accomplished, the image may be controlled by software to pursue better visual effects.

In this embodiment, each of the two optical axes O of FIG. 5 moves 3 mm inwardly, so that the distance between the two optical axes O of FIG. 5 is about 6 mm less than the distance between the two optical axes O of FIG. 4. Each of the two optical axes O of FIG. 6 moves 3 mm outwardly, so the distance between the two optical axes O of FIG. 6 is about 6 mm greater than the distance between the two optical axes O of FIG. 4. That is, the range of adjustment of the head-mounted display apparatus 1 of this embodiment is about 12 mm, that may be changed according to actual needs.

It should be noted that, in the previous embodiments, the adjustment of the interpupillary distance is accomplished as the first bottom plate 100 and the second bottom plate 110 move symmetrically, so that the optical elements 20 move symmetrically. However, in other embodiments, the structures of the first gear rack 130 and the second gear rack 140 may be changed, so that the first bottom plate 100 and the second bottom plate 110 move asymmetrically and the optical elements 20 move asymmetrically, either.

A device including a one-piece display module for adjusting the interpupillary distance and a head-mounted display apparatus are provided. Even the housing is sealed, with the deformation part, the holder may still move relative to the base to change the positions of the optical elements and to achieve the target of adjusting the interpupillary distance.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A device for adjusting interpupillary distance, comprising:
   an adjustment bottom;
   a housing, disposed on the adjustment bottom, comprising
      a base, a holder, and a deformation part disposed between the base and the holder, wherein the holder moves relative to the base via the deformation part; and an adjustment support, connected to the holder and the adjustment bottom, wherein the adjustment support comprises a main body and a plurality of supporting parts arranged symmetrically to support the main body, and wherein the supporting parts of the adjustment support comprise a through hole, and the adjustment bottom comprises a protrusion corresponding to the through hole.

2. The device for adjusting interpupillary distance as claimed in claim 1, wherein the adjustment bottom further comprises a first bottom plate, a second bottom plate, and a connection piece movably connected to the first bottom plate and the second bottom plate, wherein the first bottom plate and the second bottom plate move relative to each other.

3. The device for adjusting interpupillary distance as claimed in claim 2, wherein the connection piece is a connection bar, and a distance between the first bottom plate and the second bottom plate is changed by movement or rotation of the connection bar.

4. The device for adjusting interpupillary distance as claimed in claim 2, wherein the connection piece comprises:
a first gear rack, disposed on the first bottom plate;
a second gear rack, disposed on the second bottom plate; and
a gear, engaged with the first gear rack and the second gear rack.

5. The device for adjusting interpupillary distance as claimed in claim 4, wherein the gear comprises an inner gear and an outer gear, and a size of the inner gear is smaller than a size of the outer gear.

6. The device for adjusting interpupillary distance as claimed in claim 5, wherein the inner gear engages with the first gear rack and the second gear rack, and rotation of the inner gear is conducted by rotation of the outer gear.

7. The device for adjusting interpupillary distance as claimed in claim 1, wherein the housing is sealed.

8. The device for adjusting interpupillary distance as claimed in claim 1, wherein the base, the holder, and the deformation part are formed integrally.

9. The device for adjusting interpupillary distance as claimed in claim 1, wherein the deformation part is made of a flexible material.

10. The device for adjusting interpupillary distance as claimed in claim 1, further comprising a sliding shaft passing through a portion of the adjustment support, wherein the sliding shaft is disposed on the base.

11. The device for adjusting interpupillary distance as claimed in claim 1, wherein the holder comprises an engagement part, and the adjustment support comprises an engagement structure corresponding to the engagement part.

12. A head-mounted display apparatus, comprising:
a device for adjusting interpupillary distance as in claim 1;
an optical element, disposed in the holder; and
a display module, disposed between the base and the adjustment bottom.

13. The head-mounted display apparatus as claimed in claim 12, wherein an internal space of the holder is provided with a trench to strengthen connection between the holder and the optical element.

14. The head-mounted display apparatus as claimed in claim 12, wherein the display module is a one-piece display module.

15. The head-mounted display apparatus as claimed in claim 14, wherein the display module comprises a left-eye display module and a right-eye display module.

16. The head-mounted display apparatus as claimed in claim 12, wherein a range for adjusting the interpupillary distance is about 12 mm.

17. The head-mounted display apparatus as claimed in claim 12, further comprising an adhesion element disposed between the optical element and the holder.

18. The head-mounted display apparatus as claimed in claim 12, further comprising an adhesion element disposed between the display module and the housing.

* * * * *